United States Patent
Baumstuemmler et al.

(10) Patent No.: US 8,852,644 B2
(45) Date of Patent: *Oct. 7, 2014

(54) METHOD AND DEVICE FOR PRODUCING MICROPARTICLES OR NANOPARTICLES

(75) Inventors: Bernd Baumstuemmler, Saarlouis (DE); Bernd Penth, Lebach (DE); Felix Penth, Lebach (DE); Akif Emre Tuereli, Saarbruecken (DE)

(73) Assignee: Instillo GmbH, Saarlouis (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/636,347
(22) PCT Filed: Mar. 21, 2011
(86) PCT No.: PCT/DE2011/075044
§ 371 (c)(1),
(2), (4) Date: Sep. 21, 2012
(87) PCT Pub. No.: WO2011/116763
PCT Pub. Date: Sep. 29, 2011

(65) Prior Publication Data
US 2013/0012551 A1    Jan. 10, 2013

(30) Foreign Application Priority Data
Mar. 22, 2010  (DE) .......................... 10 2010 010 996

(51) Int. Cl.
| A61K 9/14 | (2006.01) |
| B01J 13/02 | (2006.01) |
| A61K 9/127 | (2006.01) |
| B32B 5/16 | (2006.01) |
| B01J 2/06 | (2006.01) |
| B01J 2/04 | (2006.01) |

(52) U.S. Cl.
CPC .... B01J 2/06 (2013.01); B01J 2/04 (2013.01); *Y10S 977/773* (2013.01)
USPC ............. 424/489; 264/4.4; 264/4.6; 428/402; 427/213.3; 977/773

(58) Field of Classification Search
None
See application file for complete search history.

(56) References Cited

U.S. PATENT DOCUMENTS

| 5,118,529 A | 6/1992 | Klinedinst |
| 5,314,506 A | 5/1994 | Midler, Jr. et al. |

(Continued)

FOREIGN PATENT DOCUMENTS

| DE | 196 17 085 A1 | 10/1997 |
| DE | 102 14 031 A1 | 2/2004 |

(Continued)

OTHER PUBLICATIONS

Dong, Y. et al., "A continuous and highly effective static mixing process for antisolvent precipitation of nanoparticles of poorly water-soluble drugs," International Journal of Pharmaceutics, Elsevier BV, NL, vol. 386, No. 1-2, Feb. 15, 2010, pp. 256-261, XP026857248, ISSN: 0378-5173. ISR.

(Continued)

*Primary Examiner* — Carlos Azpuru
(74) *Attorney, Agent, or Firm* — Collard & Roe, P.C.

(57) ABSTRACT

The invention relates to a method for producing microparticles or nanoparticles of water-soluble and water-insoluble substances by controlled precipitation, co-precipitation and self-organization processes in microjet reactors, a solvent, which contains at least one target molecule, and a nonsolvent being mixed as jets that collide with each other in a microjet reactor at defined pressures and flow rates and thereby effect very rapid precipitation, co-precipitation or a chemical reaction, during the course of which microparticles or nanoparticles are formed. In order to create such a method, with which the particle size of the resulting microparticles or nanoparticles can be specifically controlled, it is proposed within the scope of the invention that particle size be controlled by the temperature at which the solvent and nonsolvent collide, the flow rate of the solvent and the nonsolvent and/or the amount of gas, smaller particle sizes being obtained at lower temperatures, at high solvent and nonsolvent flow rates and/or in the complete absence of gas.

5 Claims, 6 Drawing Sheets

(56) References Cited

U.S. PATENT DOCUMENTS

Figure 1:
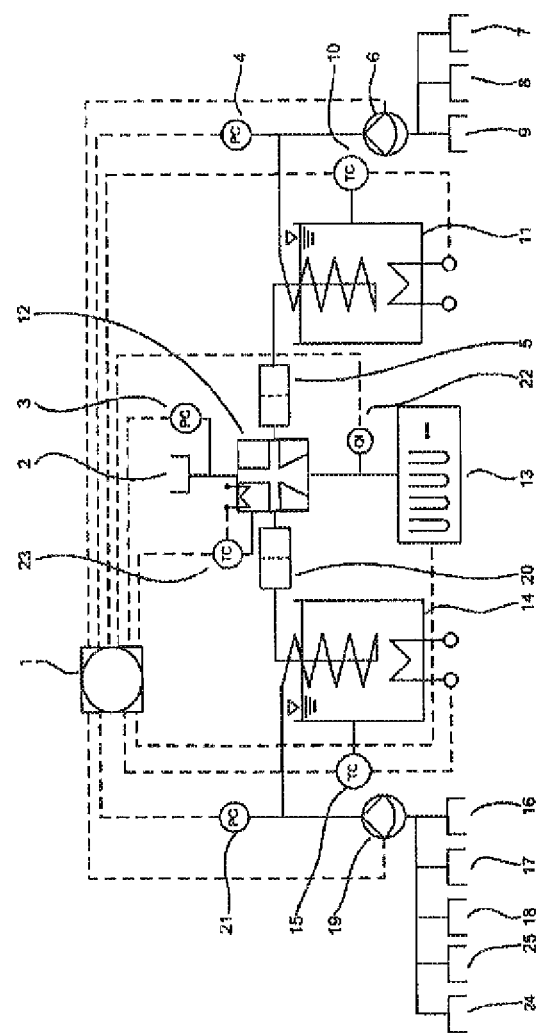

| | | | |
|---|---|---|---|
| 5,534,270 | A | 7/1996 | De Castro |
| 5,833,891 | A | 11/1998 | Subramaniam et al. |
| 6,074,441 | A | 6/2000 | Schulte et al. |
| 6,177,103 | B1 | 1/2001 | Pace et al. |
| 6,558,435 | B2 | 5/2003 | Am Ende et al. |
| 6,862,890 | B2 | 3/2005 | Williams, III et al. |
| 7,041,144 | B2 | 5/2006 | Kozyuk |
| 2003/0206959 | A9 | 11/2003 | Kipp et al. |
| 2004/0173139 | A1 | 9/2004 | Kozyuk |
| 2005/0139144 | A1 | 6/2005 | Muller et al. |
| 2008/0279928 | A1 | 11/2008 | Moschwitzer |
| 2009/0214655 | A1 | 8/2009 | Ganan Calvo et al. |
| 2009/0297565 | A1 | 12/2009 | Muller et al. |
| 2011/0294770 | A1 | 12/2011 | Tuereli et al. |

FOREIGN PATENT DOCUMENTS

| | | |
|---|---|---|
| DE | 10 2005 048 201 | 4/2006 |
| DE | 10 2005 011 786 A1 | 9/2006 |
| DE | 10 2005 017 777 | 10/2006 |
| DE | 10 2005 048 021 B3 | 4/2007 |
| DE | 10 2005 053 862 | 5/2007 |
| DE | 10 2009 008 478 | 8/2010 |
| EP | 1 165 224 | 1/2002 |
| EP | 1 652 515 A1 | 5/2006 |
| WO | WO 00/38811 A1 | 7/2000 |
| WO | WO 00/61275 A2 | 10/2000 |
| WO | WO 02/055059 A2 | 7/2002 |
| WO | WO 02/060275 | 8/2002 |
| WO | WO 2005/041970 | 5/2005 |
| WO | WO 2009/020434 | 2/2009 |

OTHER PUBLICATIONS

International Search Report of PCT/DE2011/075044, Jul. 21, 2011.

| Flow Rate Solvent mL/min | Flow Rate Non-Solvent mL/min | Particle Size | PDI |
|---|---|---|---|
| 5 | 0,1 | 186,0 | 0,154 |
| 5 | 1 | 141,2 | 0,182 |
| 5 | 5 | 154,3 | 0,138 |
| 10 | 0,1 | 358,0 | 0,100 |

METHOD AND DEVICE FOR PRODUCING MICROPARTICLES OR NANOPARTICLES

CROSS REFERENCE TO RELATED APPLICATIONS

This application is the National Stage of PCT/DE2011/075044 filed on Mar. 21, 2011, which claims priority under 35 U.S.C. §119 of German Application No. 10 2010 010 996.7 filed on Mar. 22, 2010, the disclosure of which is incorporated by reference. The international application under PCT article 21 (2) was not published in English.

BACKGROUND OF THE INVENTION

1. Field of the Invention

The invention relates to a method for producing microparticles or nanoparticles of water-soluble and water-insoluble substances by controlled precipitation, co-precipitation and self-organization processes in microjet reactors, a solvent, which contains at least one target molecule, and a nonsolvent being mixed as jets that collide with each other in a microjet reactor at defined pressures and flow rates to effect very rapid precipitation, co-precipitation or a chemical reaction, during the course of which microparticles or nanoparticles are formed.

The invention relates further to a device for producing microparticles or nanoparticles of water-soluble and water-insoluble substances in microjet reactors, said device having at least two nozzles each of which has its own pump and feed line for injecting one liquid medium in each case into a reactor chamber enclosed in a reactor housing and on to a shared collison point, the reactor housing being provided with a first opening through which a gas can be introduced so as to maintain the gaseous atmosphere within the reactor, notably at the collision point of the two liquid jets, and to cool the resulting products, and a further opening for removing the resulting products and excess gas out of the reactor housing.

2. Description of the Related Art

In numerous branches of industry, in particular in the medical and pharmaceutical fields, there is a frequent need to micronize or nanosize large particles. These methods are being used increasingly often, particularly in the pharmaceutical field, to enhance the bioavailability of active ingredients or to deliver one or more active ingredients to a targeted site of action.

The term bioavailability refers to the degree to which an active ingredient, following administration thereof, can be made available to the targeted tissue. Many factors are known to influence bioavailability, for example, a substance's solubility in water, it's release rate or particle size. Micronizing or nanosizing substances that dissolve poorly in water thus enhances their bioavailability, either by improving their solubility or increasing their release rate.

Another method of enhancing bioavailability is via drug targeting or drug delivery, whereby particles are distributed in the target tissue according to their size or are engineered such as to have suitable surface modifications enabling them to reach the targeted site of absorption or action.

Such methods of producing microparticles and nanoparticles are described in various patent applications and patents, for example in U.S. Pat. Nos. 5,833,891 A, 5,534,270 A, 6,862,890 B, 6,177,103 B, DE 10 2005 053 862 A1, U.S. Pat. Nos. 5,833,891 A, 5,534,270 A, 6,862,890 B, 6,177,103 B, DE 10 2005 017 777 A1 and DE 10 2005 053 862 A1.

WO 02/60275 A1 describes methods of producing nanoparticles in which two immiscible liquids are charged electrically so as to achieve encapsulation. In this case, the use of toxic substances is not ruled out, meaning that product quality may suffer considerably as a result. Particle size, moreover, cannot be controlled with this method.

US 2009/0214655 A1 also describes the use of two immiscible liquids. Although a microreactor is used there to produce the nanoparticles, only the production of emulsions is described. In addition, the nanoparticles are produced in a liquid-filled space in which, once again, it is impossible to control either particle size or the particle properties. Furthermore, the device can easily become blocked due to the fact that the reactions are carried out in microchannels.

The known techniques for producing nanoparticles have many disadvantages.

"Top-down" techniques, most of which involve mechanical crushing processes such as dry or wet milling, run the risk of microbial contamination, contamination from milling-ball abrasion or degradation of the active ingredient, particularly since very lengthy milling times are needed to micronize the active ingredient. In the case of dry milling, moreover, the smallest obtainable particle size even after very lengthy milling times is still approx. 100 micrometers.

A number of "bottom-up" approaches exist for the production of nanoparticles, such as salting out, emulsification, solvent evaporation or spray vaporisation of supercritical liquids.

No matter which of these approaches is used to produce pharmaceutical nanoparticles, an increase in surface area will always be obtained compared to that of particles exceeding 1 µm in size.

The increase in surface area and in surface interactions may positively influence the release rate and make it possible to control the pharmacokinetic properties of a drug. Most of these methods, nevertheless, have the following limitations: high energy input; low level of success; upscaling problems (transition from laboratory experiment to industrial-scale production); particle size and properties are difficult to control; relatively toxic organic solvents have to be used or the methods themselves are difficult to carry out. These factors limit the use of these methods for the commercial production of nanoparticles.

As one of the various methods mentioned, the nano-precipitation or solvent-exchange method was described in U.S. Pat. No. 5,118,529 A. This relatively simple method includes the formation of nanoparticles by means of solvent/nonsolvent precipitation in a single step. Ideally, the polymer and the active ingredient are dissolved in the same solvent so as to be precipitated as nanoparticles on contact with the nonsolvent (usually water).

The rapid formation of nanoparticles is caused by the Marangoni effect as a result of eddies at the solvent/nonsolvent collision point and of diffusion of solvent into the nonsolvent.

Precipitation results in the production of nanoparticles measuring 100 to 300 nm and showing relatively narrow particle distribution when various polymers are used. Surface modifiers are not required in all cases. Normally, use is made only of non-toxic solvents.

The described prior art discloses that, especially in the pharmaceutical industry, novel methods are needed that avoid all the disadvantages connected with the conventional methods outlined above.

DE 10 2009 008 478 A1 describes a method in which solvent/anti-solvent precipitation with in-situ spray drying occurs in the presence of surface-active molecules, wherein a microjet reactor of the kind described in EP 1 165 224 B1 is used. A microjet reactor of this kind has at least two nozzles each of which has its own pump and feed line for injecting one liquid medium in each case into a reactor chamber enclosed in a reactor housing and on to a shared collision point, the reactor housing being provided with a first opening through which a gas, an evaporating liquid, a cooling liquid or a cooling gas can be introduced so as to maintain the gaseous atmosphere within the reactor, notably at the collision point of the two liquid jets, and to cool the resulting products, and a further opening for removing the resulting products and excess gas out of the reactor housing. Accordingly, a gas, an evaporating liquid or a cooling gas is introduced via an opening into the reactor chamber so as to maintain a gaseous atmosphere within the reactor, notably at the collision point of the two liquid jets, and to cool the resulting products, and the resulting products together with excess gas are removed from the reactor housing through an opening by positive pressure on the gas input side or negative pressure on the product and gas discharge side.

In DE 10 2009 008 478 A1, the active ingredient and a surface-active molecule are dissolved in a water-miscible organic phase. This organic solution and water, which serves as nonsolvent, are pumped, each through a dedicated stainless steel capillary and at a constant flow rate and pressure, by two pumps into the microreactor (referred to as the "microjet reactor"), where they collide as impinging jets. Within the reactor, solvent and nonsolvent are mixed very rapidly, the active ingredient precipitating out as nanoparticles and the resulting nanoparticle suspension being expelled from the microjet reactor either by very hot compressed air or an inert gas.

The gas vaporizes the organic solvent and the water to the effect that, after both liquid phases have vaporized, the nanoparticles of active ingredient are coated with the surface-modifying molecules. At the end of the process the nanoparticles are in powder-form.

The essential element in DE 10 2009 008 478 A1 is thus the use of heated air or an inert gas, together with a surface modifier, in such a manner that the solvent and the nonsolvent vaporize as the active ingredient precipitates and the surface modifiers coat the nanoparticles, thereby preventing further aggregation of the particles and Ostwald growth.

Although particle size can be efficiently controlled with the method described in DE 10 2009 008 478 A1, the necessity of using surface modifiers constitutes a constraint on the use of this technology for diverse microparticle or nanoparticle production strategies.

SUMMARY OF THE INVENTION

The object of this invention is thus to provide a method according to the preamble, with which it is possible to selectively control the particle size of the resulting microparticles or nanoparticles. The intention is for these to have a narrow particle-size distribution and also to allow the production of surface-modified formulations for use in drug delivery and drug targeting systems.

Particle size can be controlled alone via the temperature, alone via the flow rate, alone via the amount of gas or via arbitrary combinations of these parameters.

It is within the scope of the invention to select the target molecule from the group consisting of biologically useful substances, imaging substances, cosmetic substances, colorants, pigments, food substances, food additives, dietary supplements, biocides, insecticides, fungicides, pesticides, herbicides, pharmaceutically useful substances, in particular human drugs or veterinary drugs.

A refinement of the invention consists in that the nonsolvent contains at least one auxiliary agent.

The nonsolvent may also consist exclusively of water.

It has proved advantageous in this connection for the weight ratio of target molecule to auxiliary agent to be at least 1:100.

In a preferred embodiment of the invention, the solvent and the nonsolvent are subsequently removed from the resulting suspension by vaporizing them.

The invention also includes a device for producing microparticles or nanoparticles of water-soluble and water-insoluble substances in microjet reactors, said device having at least two nozzles each of which has its own pump and feed line for injecting one liquid medium in each case into a reactor chamber enclosed in a reactor housing and on to a shared collision point, the reactor housing being provided with a first opening through which a gas can be introduced so as to maintain the gaseous atmosphere within the reactor, notably at the collision point of the two liquid jets, and to cool the resulting products, and a further opening for removing the resulting products and excess gas out of the reactor housing, wherein means for controlling the temperature of the liquids, the flow rate of the liquids and/or the amount of gas in the reactor chamber are provided.

The invention surprisingly showed that the temperature at which the liquids collide is instrumental for the selective control of particle size. Lower temperatures lead to decreasing particle sizes. Smaller particle sizes are also obtained by reducing the amount of gas—right through to a complete absence thereof—in the reactor chamber.

This invention is also based on the surprising finding that increasing amounts of air can influence interactions between the developing diffusion layers in such a way that, in many applications, relatively large nanoparticles are ultimately formed, leading in some cases to undesired crystal growth. Conversely, it was surprisingly found that a complete absence of air or inert gas led to the formation of smaller particles. If no stream of gas is used, the rapid precipitation of particles apparently ends as soon as the liquid jets reach the outer periphery of the liquid disc formed when they collide as impinging jets. This presumably results in early termination of particle growth and in smaller particles showing homogeneous particle distribution.

The effect on particle size of the gas flow and the heating needed to vaporize the solvent can be explained for the moment as follows:

At lower temperatures, solubility is reduced and the metastability zone is so narrow that supersaturation readily occurs if solvent is injected into the anti-solvent.

The nucleation process is a process whereby free energy is lost and heat is liberated: low temperatures thus promote a high nucleation rate.

Lower temperatures can inhibit particle growth. The high nucleation rate and slow growth rate at low temperatures thus results in the formation of smaller particles.

The finding that particle size and the degree of aggregation increase with increasing temperature may be explained by the fact that, as the temperature rises, the substance or additive is closer to its glass transition temperature.

Particle size may also be controlled via solvent and nonsolvent flow rates; small particles are obtained by selecting a high flow rate, large particles by selecting a low flow rate.

The term "precipitation reactor" or "microjet reactor" includes all the geometries described in EP 1 165 224 B1 and DE 10 2009 008 478 A1.

It is important to mention at this point that, to establish the object of the invention, it is not possible to use a conventional microreactor instead of a microjetreactor of the kind described in EP 1 165 224 B1, which is operated without air, as mixing in a conventional microreactor engineered, for example, as a T-mixer, leads to substantially longer mixing times because these reactors operate routinely in the laminar range. In order to carry out the method of the invention, the microjet reactor may also be designed such that the liquid jets collide at an angle other than 180° or that the jets are mixed on a shared impinging surface. In these cases, however, the obtainable particle size is larger.

A further observation is that microjet reactors are the only reactor type in which precipitation reactions or other kinds of reaction can be carried out freely in a gas-filled chamber. This is what makes it possible to obtain a given particle size by altering process parameters such as temperature, pressure or flow rate. On account of the fact that the reaction takes place in a free space, it is impossible for products or by-products to block the reactor and possible bring the whole system to a standstill.

According to the invention, nanoparticle or microparticle formulations are also produced for drug targeting and drug delivery systems. To this end, it is necessary to formulate water-soluble substances to nano- and micro-particulate systems using suitable auxiliary agents. In previous processes, however, it was only possible to formulate water-insoluble active ingredients, the production of which was based exclusively on the precipitation of such particles on account of their poor solubility at high temperatures, using heated inert gas or air.

In the experimental setup of the invention, by contrast, in which preferably no gas flow is used during the operating cycle, it is also possible to produce nanoparticles of water-soluble molecules. In doing so, it is possible to simultaneously reduce the temperature of the liquid used as nonsolvent, the temperature of the microjet reactor and/or the temperature of the solvent containing the substance in such a way that the solubility of the substance in question in the solvent/nonsolvent mixture is lowered sufficiently for the substance to precipitate out as nanoparticles. These may then be coated with a suitable additive in a second microjet reactor coupled directly with the first microjet reactor in a 2-step process. The nanoparticles formed can be surface-coated with auxiliary agents or biologically active substances by way of absorption or integration in order to obtain them as formulations which, for example, are resistant to gastric juices or are mucoadhesive.

The particles that form during precipitation may be treated, preferably immediately after precipitation (e.g. within 0.1 to 5 s), in a second cascading microjet reactor or subjected later to mechanical treatment. This mechanical treatment may take the form of one-time or repeated treatment by means of ultrasound, by pressing the dispersion under pressure through nozzles, by vigorous stirring, for example with an Ultra-Turrax, or as impinging jets. The particles can be stabilised in this way in a continuous process.

The method of the invention also provides for the generation of magnetic particles.

It is furthermore also possible to precipitate out highly water-soluble substances as nanoparticles by means of a self-organization process. To this end, the insoluble derivatives obtained from a reaction taking place in the microjet reactor, such as a neutralisation or salting-out reaction, are precipitated out. An active target molecule may be precipitated, for example by reaction with one or more auxiliary agents, in such manner as to produce particles that are insoluble in the solvent/nonsolvent mixture. It is likewise possible to co-precipitate an active target molecule with the insoluble reaction product of two or more auxiliary agents.

An additional benefit resulting from the absence of heated gases is that it is also possible to formulate sensitive molecules without destroying their biological activity. Such molecules include, but are not limited to, proteins, peptides, biological markers and biopharmaceuticals.

With this invention, it is also possible to co-precipitate a poorly soluble substance with a pharmaceutical excipient without requiring a surfactant, and to surface-modify such nanoparticles with biologically active molecules for use in drug delivery and drug targeting.

The object of this invention, namely to provide a method and a device enabling the production of high yields of stabilised nanoparticles or microparticles as suspensions of water-soluble and water-insoluble substances by means of solvent/nonsolvent precipitation in a microjet reactor, is thereby established. Characteristic features of the invention are that these particles have a narrow particle-size distribution and also allow the production of surface-modified formulations for use in drug delivery and drug targeting systems. The apparatus permits process-optimized production through use of DoE (Design of Experiments) and automated parameterisation combined with online particle-size determination.

The method is robust, scaleable and can be used for a wide range of water-soluble and water-insoluble substances, including biological substances.

BRIEF DESCRIPTION OF THE DRAWINGS

The invention is described in more detail below.

FIG. 1 shows the setup, including the air feed, for the production of microparticles and nanoparticles;

FIG. 2 shows the setup, excluding the air feed, for the production of microparticles and nanoparticles;

FIG. 3 shows the effect of the relation between the flow rates on particle size;

FIG. 4 is a graph showing the effect of temperature on particle size, in which the x-axis indicates the temperature in ° C. and the y-axis the particle size in nm;

FIG. 5 is a graph showing the effect of gas pressure on particle size, in which the x-axis indicates the pressure in bar and the y-axis the particle size in nm;

FIG. 6 shows TEM images of nanoparticles produced in the microjet reactor;

FIG. 7 is a 3-D diagram showing the effect of gas and temperature on particle size, in which the x-axis indicates the temperature in ° C., the y-axis the particle size in nm and the z-axis the pressure in bar.

DETAILED DESCRIPTION OF THE PREFERRED EMBODIMENTS

This invention makes use of controlled solvent/nonsolvent precipitation in such a way that solvent and non-solvent streams with flow rates exceeding 0.1 ml/min collide as impinging jets at a speed preferably greater than 1 m/s, more preferably greater than 50 m/s, and a Reynolds number of more than 100, preferably more than 500. Solvent and non-solvent are formed in nozzles to jets which are preferably smaller than 1,000 μm, more preferably smaller than 500 μm and best of all smaller than 300 μm and have pressures generally of 1 bar, preferably in excess of 10 bar and even more preferably in excess of 50 bar, the pressure being controlled in this method by a pressure regulator.

These two impinging jets collide in the microjet reactor in such a way as to effect precipitation at the point of collision of the jets, which, depending on the reactor geometry, form a double-disc-shaped structure there comprising fast-moving liquid jets. In the disc-edge area, very rapid mixing occurs at mixing speeds generally below 1 millisecond, frequently below 0.5 ms and mostly below 0.1 ms.

In this invention, the term "solvent" means a solvent containing one or more active target substances together with one or more auxiliary agents including, but not limited to, pharmaceutical excipients, surfactant molecules, polymers, copolymers or block polymers.

The term "nonsolvent" also means a solvent containing one or more active target substances or auxiliary agents used to produce nanoparticles or microparticles.

These liquids may be heated or cooled, namely by an external heating means or directly in the pump, in order to dissolve the active target substance and/or the auxiliary agent, to enable the formation of nanoparticles with the desired particle size and surface properties or to stabilise the resulting molecules.

This invention includes methods of producing particles of water-soluble and water-insoluble substances in a microjet reactor and simultaneously stabilising these either with one or more auxiliary agents or surface modifiers, the resulting particles having particle sizes of up to 2,000 nm, preferably less than 1,000 nm, more preferably less than 500 nm and best of all less than 200 nm, with polydispersion indices generally below 2.0, preferably below 1.0 and most preferably below 0.4.

As an alternative, another embodiment of the invention includes a method and an apparatus which allow self-organisation processes in which one or more active target molecules react chemically with one or more suitable auxiliary agents that are soluble in the nonsolvent, resulting in a product that is insoluble in the solvent/nonsolvent mixture and thus permits the formation of microparticles or nanoparticles with sizes that vary according to parameters including, but not limited to, flow rate or concentration of the substances.

It is also possible to co-precipitate one or more active target substances with an insoluble reaction product of one or more auxiliary agents.

This invention furthermore includes methods of co-precipitating one or more active target substances with one or more suitable auxiliary agents in which the substance is dissolved on a molecular scale such as to form particulate systems, and provides for the surface-coating of such systems with suitable target molecules including, but not limited to, antibodies.

The active target substances mentioned above-include biologically useful substances, imaging substances, pharmaceutically useful substances, cosmetically useful substances, substances from the field of food or dietary supplements, and, in particular, human and veterinary drugs.

The solvent and nonsolvent are solutions and mixtures constituting liquid components that may contain their mass fraction in solution or in suspended form.

The solvent and nonsolvent used in this invention may be an aqueous or organic phase or a solution, mixture, emulsion or suspension, or a combination thereof.

Organic solvents of this kind may be miscible or immiscible with water. Suitable organic solvents include, but are not limited to, readily water-miscible substances such as ethanol, methanol, tetrahydrofuran, dimethylsulphoxide, acetone and 2-isopropanol, and poorly miscible substances such as toluene, hexane, heptane, pentane and methylene chloride.

Suitable medicinal target molecules may be selected from a wide range of known drug classes, including, but not limited to, painkillers, anti-inflammatory substances, anthelmintics, antiarrhythmic substances, antibiotics (including penicillins), anticoagulants, antidepressants, antidiabetic substances, anti-epileptics, antihistamines, antihypertensive substances, antimuscarinic substances, antimycobacterial substances, antineoplastic substances, immunosuppressants, antithyroid substances, antiviral substances, anoxiolytic sedatives (hypnotics and neuroleptics), astringents, beta-adrenoreceptor antagonists, blood products and blood substitute products, inotropic substances for the heart, contrast agents, corticosteroids, substances to suppress coughing, (expectorants and mucolytics), diagnostic substances, diagnostic imaging substances, diuretics, dopaminergic substances (substances to combat Parkinson's disease), hemostatics, immunological substances, substances to regulate fat, muscle relaxants, parasympathomimetics, parathyroidal calcitonin and biphosphonates, prostaglandins, radiopharmaceuticals, sex hormones (including steroids), antiallergics, stimulants and anorectics, sympathomimetics, thyroidal substances, vasodilators and xanthines.

The active ingredients are commercially available and/or can be manufactured using techniques known to persons skilled in the art. To the extent applicable, the active ingredients listed above may be used as free bases or as one or more of their known salts.

The above-cited active ingredients may be processed such as to enable their use in numerous different pharmaceutical compositions and formulations, for example for oral administration as tablets, capsules or suspensions, for pulmonary or nasal administration, topical administration as emulsions, ointments or creams, or parenteral administration as suspensions, microemulsions or depot formulations.

Suitable auxiliary agents may be added, such as inert diluents, solubilizers, suspending agents, adjuvants, wetting agents, sweeteners, perfuming or flavouring substances, isotonic substances, colloidal dispersants and surfactants, including, but not limited to, charged phospholipids such as dimyristoylphosphatidylglycerin, algininic acid, alginates, acacia resin, gum arabic, 1,3-butylene glycol, benzalkonium chloride, colloidal silicon dioxide, cetosteryl alcohol, cetomacrogol emulsifying wax, casein, calcium stearate, cetylpyridine chloride, cetyl alcohol, cholesterol, calcium carbonate, CRODESTAS F-110, which is a mixture of sucrose stearate and sucrose distearate (Croda Inc.), clays, kaolin and bentonite, derivates of cellulose and salts thereof, such as hydroxypropyl methylcellulose (HPMC), sodium carboxymethyl cellulose, carboxymethyl cellulose and salts thereof, methyl cellulose, hydroxyethyl cellulose, hydroxypropyl cellulose, hydroxypropyl methylcellulose phtalate, non-crystalline cellulose, dicalcium phosphate, dodecyltrimethylammonium bromide, dextrane, dialkylester of sodium sulfosuccinate (e.g. AEROSEL OT, American Cyanamid), gelatine, glycerol, glycerol monostearate, glucose, p-isononylphenoxypoly (glycidol), also known as Olin 10-G or 10-GR surfactant (Olin Chemicals, Stamford, Conn.); glucamides such as octanoyl-N-methylglucamide, decanoyl-N-methylglucamide and heptanoyl-N-methylglucamide, lactose, lecithin (phosphatides), maltosides such as n-dodecyl-beta-D-maltoside, mannitol, magnesium sterarate, magnesium aluminium silicates, oils such as cotton oil, seed oil, olive oil, castor oil and sesame oil; paraffin, potato starch, polyethylene glycol (e.g. CARBOWAX 3350, CARBOWAX 1450 and CARBOPOL 9340 (Union Carbide), polyoxyethylene alkyl ester (e.g. macrogolethers such as CETOMACROGOL 1000), polyoxyethylene sorbitol fatty acid esters (e.g. TWEENS, ICI Specialty Chemicals), polyoxyethylene castor oil derivatives, polyoxyethylene stearates, polyvinyl alcohol (PVA), polyvinylpyrrolidone (PVP), phosphates, 4-(1,1,3,3-tetramethylbutyl)phenol polymer with ethylene oxide and formaldehyde (also known as TYLOXAPOL, SUPERIONE and TRITON), poloxamers and polaxamines (e.g. PLURONICS F68LF, F87, F108 and TETRONIC 908, available from BASF Corporation, Mount Olive, N.J.), pyranosides such as n-hexyl-β-D-glucopyranoside, n-decyl-β-D-glucopyranoside, n-octyl-β-D-glucopyranoside, quaternary ammonium compounds, silica, sodium citrate, starches, sorbitol esters, sodium carbonate, solid polyethylene glycols, sodium dodecyl sulfate, sodium lauryl sulfate (e.g. DUPONAL P, DuPont), stearic acid, sucrose, tapioka starch, talc, thioglucosides such as n-heptyl-β-D-thioglucoside, tragacanth, triethanolamine, TRITON X-200 (Rohm and Haas); and the like.

The inert diluents, solubilizers, emulsifyers, adjuvants, wetting agents, isotonic substances, colloidal detergents and surfactants are commercially available or can be prepared by methods known to persons skilled in the art.

The additives used in this invention may potentially also show activity of their own. These additives include, but are not limited to, the group of anti-oxidative molecules.

EXAMPLES

Example 1

Figures 3, 4:
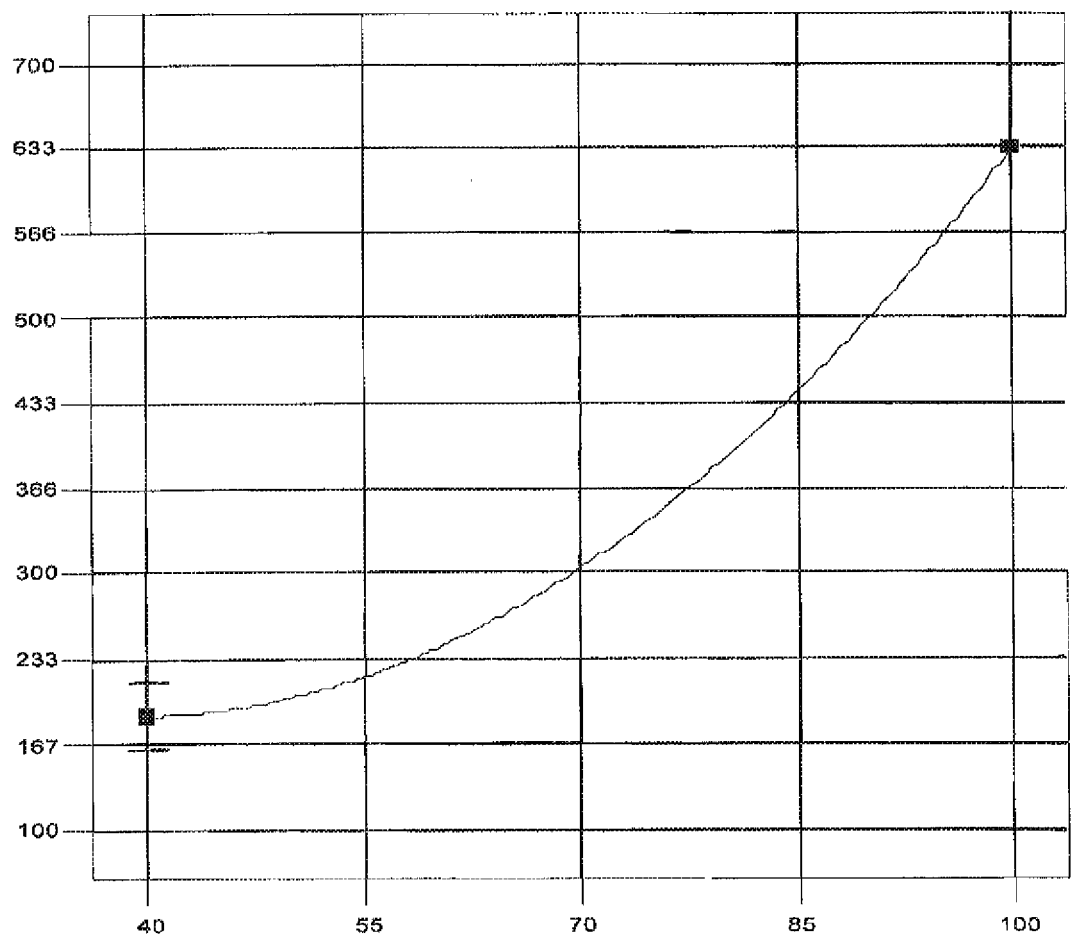

Nanoparticles were produced using Nifedipin as model substance and Eudragit S 100 as model excipient. Eudragit S 100 and Nifedepin were dissolved together in acetone to give a concentration of 10 mg/ml and 1 mg/ml respectively. Water was used as nonsolvent. A temperature of 40° C. was set for the solvent, the nonsolvent and the microjet reactor. Particles with different particle sizes were produced by altering the solvent and nonsolvent flow rates. The table in FIG. 3 shows the particle sizes obtained.

Example 2

Nanoparticles were produced as described in Example 1 except that, in order to observe the influence of temperature on particle size, the solvent and nonsolvent flow rates were fixed at 10 ml/min while the temperature was varied. The graph in FIG. 4 shows the particle sizes obtained. The x-axis indicates the particle size and the y-axis the corresponding temperature. The particle size is seen to increase with increasing temperature.

Example 3

Figure 5:
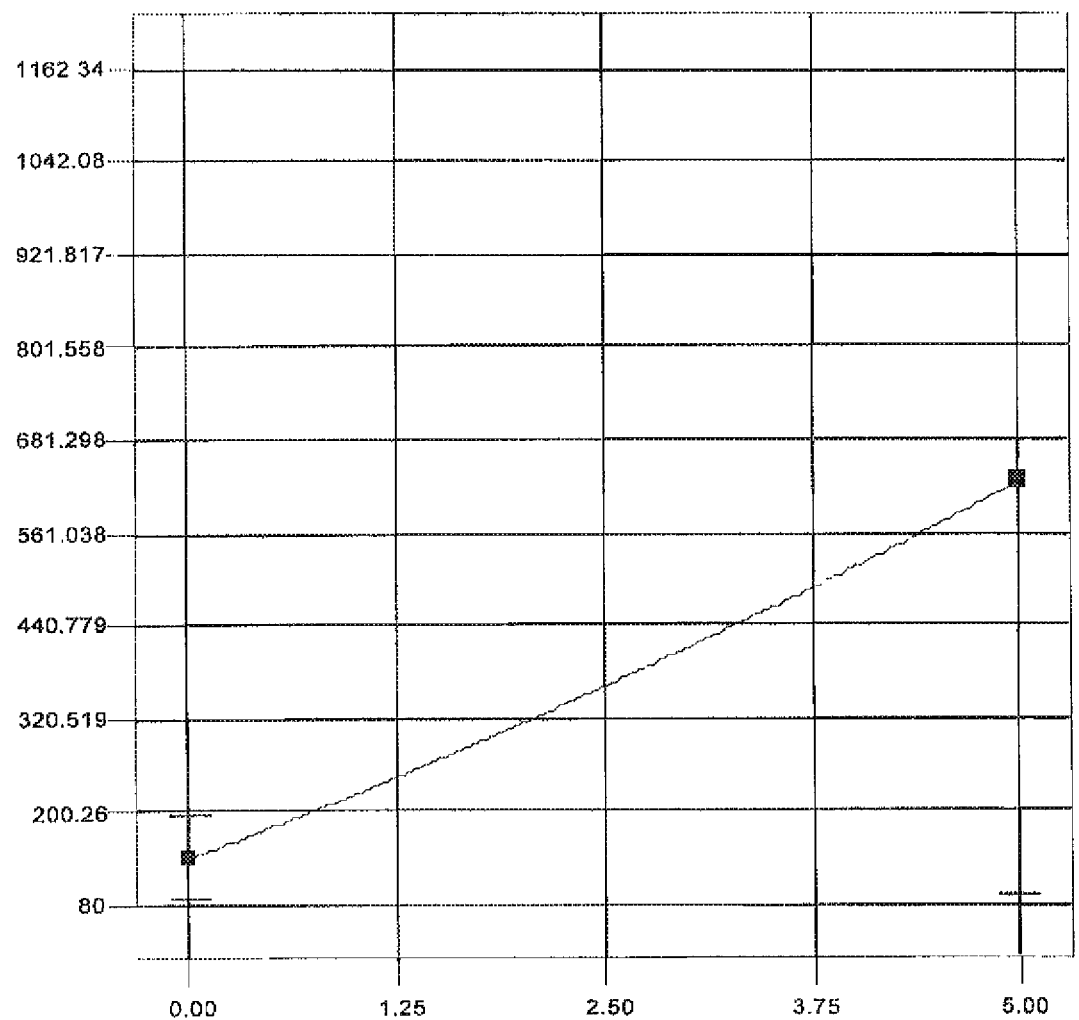
Figure 6:
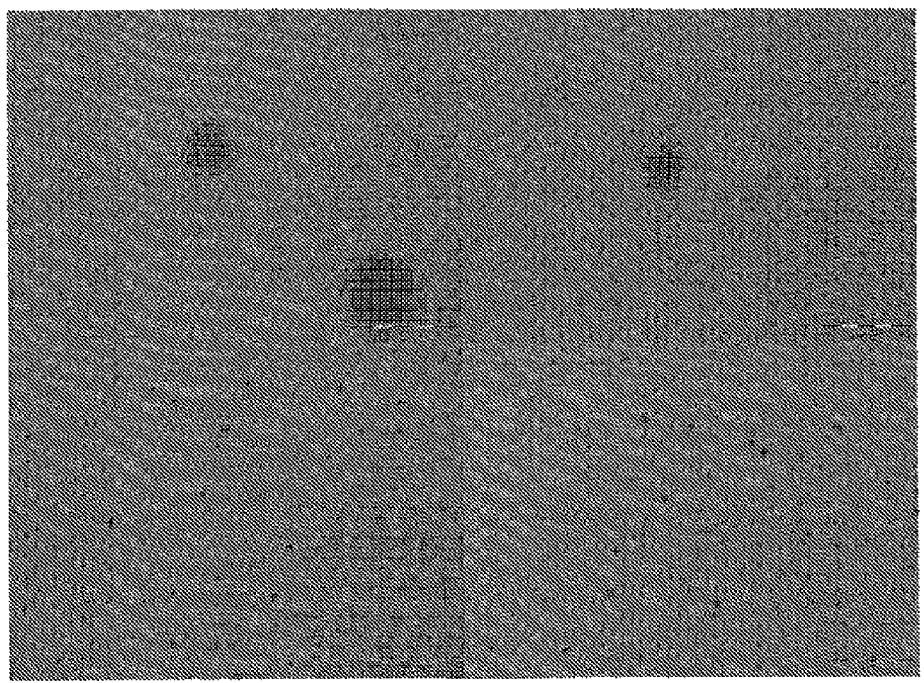
Figure 7:
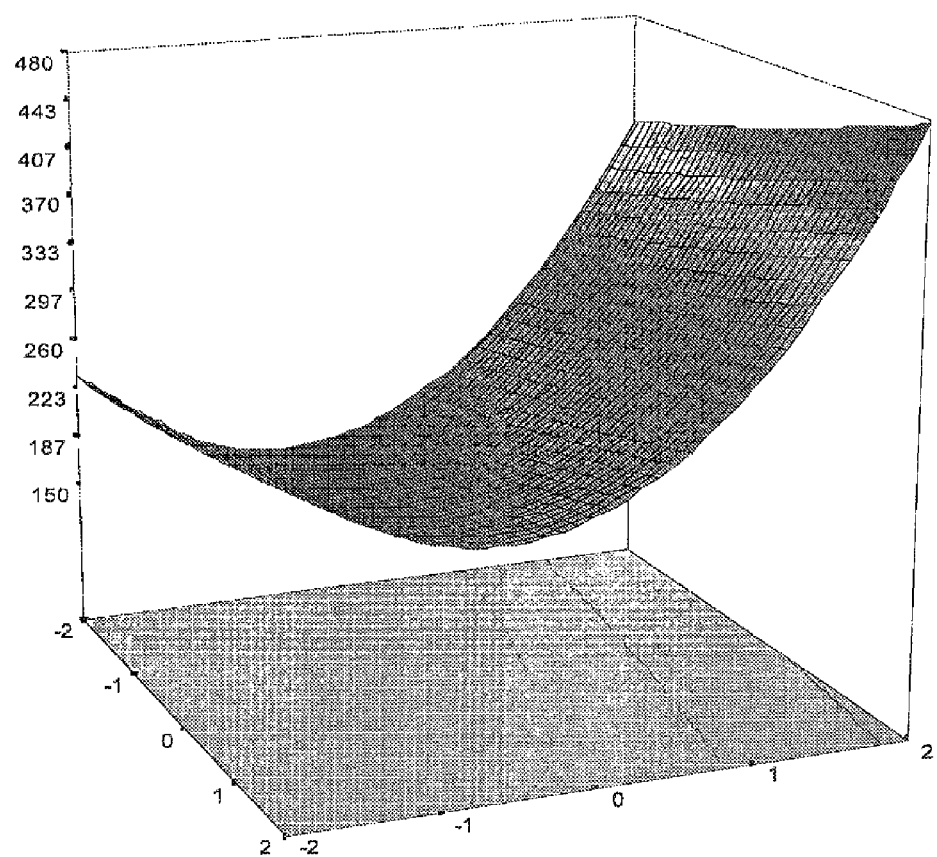

Nanoparticles were produced as described in Example 1 except that, in order to observe the influence of gas pressure on particle size, the solvent and nonsolvent flow rates were fixed at 10 ml/min while the gas pressure was varied. For this experiment, an additional gas infeed line for introducing inert nitrogen gas was added to the experimental setup shown in FIG. 1. An increase in particle size with increasing gas pressure was demonstrated using this experimental setup. The graph in FIG. 5 shows the results of the experiment from this example. The x-axis indicates the particle size [nm], and the y-axis the gas pressure [bar]. This example shows that, as the gas pressure increases, particle size increases too.

Figure 2:
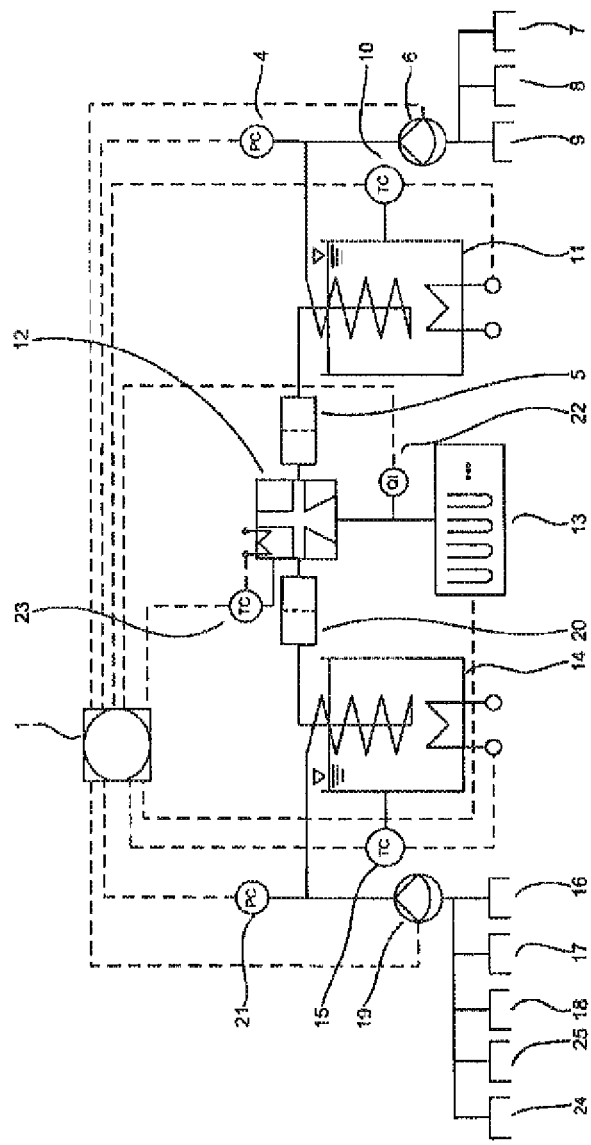

FIGS. 1 and 2 show a typical configuration of the device according to the invention. The device comprises an arithmetic and control unit (1), an air and gas infeed (2), a pressure sensor (3) for controlling the air pressure, pressure sensors (4, 21) for controlling the pressure of the reactant infeed, filters (5, 20), pumps (6, 19), nonsolvent reactant tanks (7, 8, 9) and solvent reactant tanks (16, 17, 18, 24, 25), temperature control means (10, 15, 23), heating/cooling units with temperature-control vessels (11, 14), a microjet reactor (12), a product discharge fraction collector (13) and an online particle-size measuring means (22).

Example 4

Nanoparticles were produced using Fenofibrat as model substance and Pluronic F68 as model excipient. Fluronic 68 and Fenofibrat were dissolved together in ethanol to give a concentration of 10 mg/ml of each. Water was used as nonsolvent. A temperature of 40° C. was set for the solvent, the nonsolvent and the microjet reactor. The particle size was set to 320 nm by modifying the flow rates of solvent and nonsolvent. Without additional stabilisation, the precipitated nanoparticles very quickly agglomerate on account of Ostwald ripening. The particle size of the agglomerates exceeds 1,000 nm. The particles were stabilised by repeated treatment, either in cascaded microjet reactors or by renewed travel through the same microjet reactor. The particle size was kept stable at 320 nm and underwent no further change with time.

The invention claimed is:

1. Method for producing microparticles or nanoparticles of water-soluble and water-insoluble substances by controlled precipitation, co-precipitation and self-organization processes in microjet reactors, a solvent, which contains at least one target molecule, and a nonsolvent being mixed as jets that collide with each other in a microjet reactor at defined pressures and flow rates to effect very rapid precipitation, co-precipitation or a chemical reaction, during the course of which microparticles or nanoparticles are formed, wherein particle size is controlled by the temperature at which the solvent and nonsolvent collide, the flow rate of the solvent and the nonsolvent and/or the amount of gas, smaller particle sizes being obtained at lower temperatures, at high solvent and nonsolvent flow rates and/or in the complete absence of gas.

2. Method according to claim 1, wherein the target molecule is selected from the group consisting of biologically useful substances, imaging substances, cosmetic substances, colorants, pigments, food substances, food additives, dietary supplements, biocides, insecticides, fungicides, pesticides, herbicides, pharmaceutically useful substances, in particular human drugs or veterinary drugs.

3. Method according to claim 1, wherein the non-solvent contains at least one auxiliary agent.

4. Method according to claim 3, wherein the weight ratio of target molecule to auxiliary agent is at least 1:100.

5. Method according to claim 1, wherein the solvent and the nonsolvent are subsequently removed from the resulting suspension by vaporizing them.

* * * * *